United States Patent [19]
Sensui

[11] Patent Number: 6,041,186
[45] Date of Patent: Mar. 21, 2000

[54] FINDER SYSTEM

[75] Inventor: Takayuki Sensui, Tokyo, Japan

[73] Assignee: Asahi Kogaku Kogyo Kabushiki Kaish, Tokyo, Japan

[21] Appl. No.: 09/084,735

[22] Filed: May 27, 1998

[30] Foreign Application Priority Data

| May 27, 1997 | [JP] | Japan | 9-152974 |
| May 27, 1997 | [JP] | Japan | 9-152975 |
| May 27, 1997 | [JP] | Japan | 9-152976 |
| May 27, 1997 | [JP] | Japan | 9-152977 |
| May 27, 1997 | [JP] | Japan | 9-152978 |
| May 27, 1997 | [JP] | Japan | 9-152979 |

[51] Int. Cl.[7] .......................... G03B 13/04; G03B 13/16; G03B 13/36
[52] U.S. Cl. ............................... 396/80; 396/84; 396/94; 396/106; 396/141; 396/147; 396/148
[58] Field of Search ..................... 396/94, 106, 139–143, 396/147, 148, 152, 116, 117, 79, 80, 81, 82, 83, 84

[56] References Cited

U.S. PATENT DOCUMENTS

| 3,367,254 | 2/1968 | Townsley | 396/117 |
| 3,529,528 | 9/1970 | Leitz | 396/117 |
| 4,983,033 | 1/1991 | Suzuki | 396/107 |
| 5,258,792 | 11/1993 | Suzuki et al. | 396/377 |
| 5,376,984 | 12/1994 | Abe | 396/373 |
| 5,537,184 | 7/1996 | Hasushita et al. | 396/374 |
| 5,692,227 | 11/1997 | Yokota et al. | 396/377 |

Primary Examiner—W. B. Perkey
Attorney, Agent, or Firm—Greenblum & Bernstein, P.L.C.

[57] ABSTRACT

A finder system including a first optical system and a second optical system apart from the first optical system by a certain base length. Based on an object distance obtained with use of an active or passive distance measuring device, degree of coincidence of images respectively formed by the first and second optical system and superimposed is varied so that superimposed images of an object that is located at the detected object distance coincide.

58 Claims, 9 Drawing Sheets

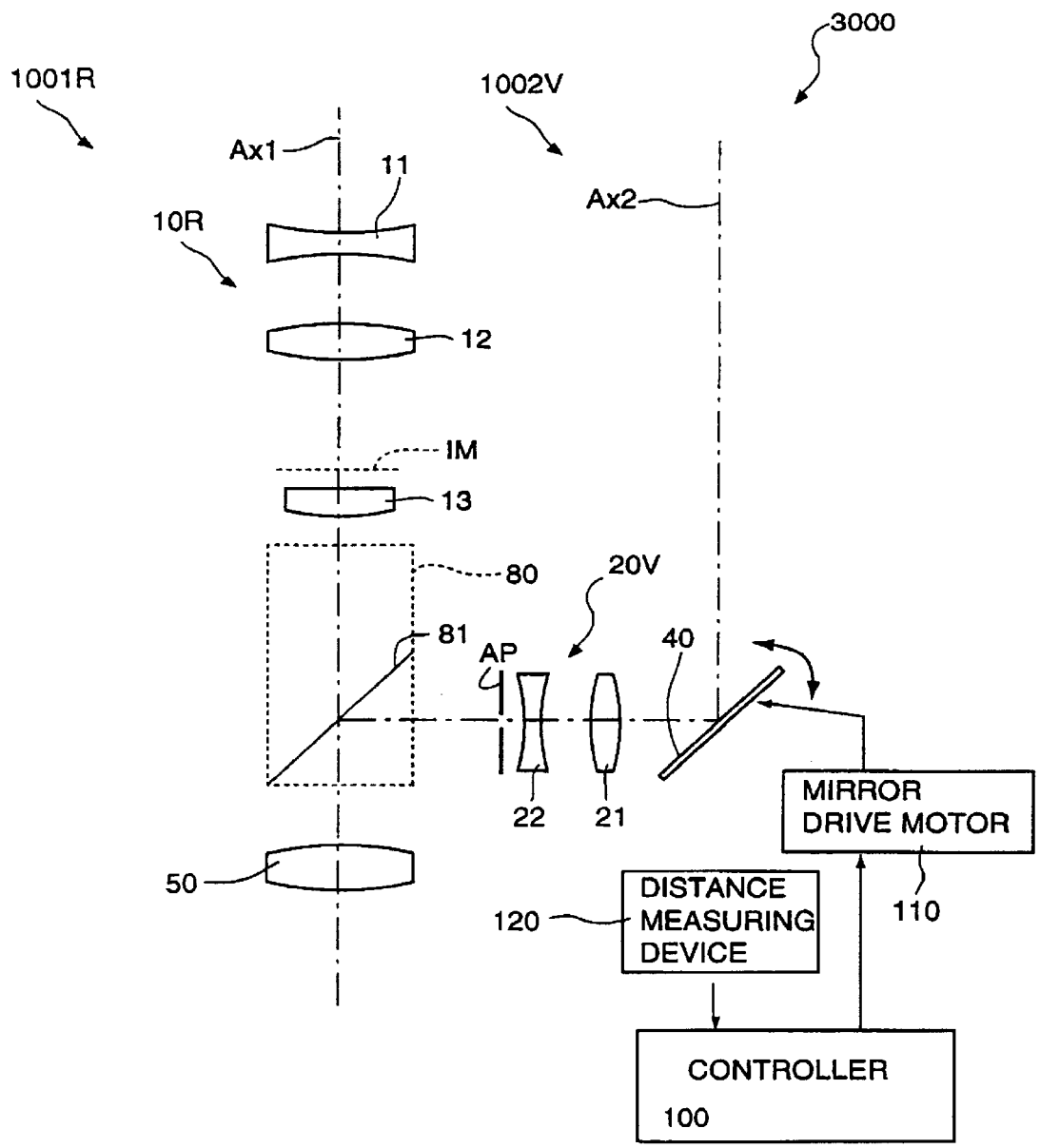

tele                              wide tele    VIRTUAL IMAGE TYPE    wide
        OBJECTIVE OPTIDDD

FINDER SYSTEM

BACKGROUND OF THE INVENTION

The present invention relates to a finder system for a camera, and more particularly to a finder system provided separately from a photographing lens of a camera.

Recently, cameras employ an automatic focusing function. In particular, in a camera whose finder system is independent from the photographing optical system, an indicator is generally provided to indicate whether an object distance has been detected. If the indicator is lit, the user recognizes that the photographing lens will be focused on an object when a photographing is taken.

In such cameras, however, even through the indicator indicates that the object distance has been detected, the object may not be an object the user intends to focus on. For example, if the object of intent is not within a focus detection zone when the distance is measured, or when the object of intent is located behind a flame or glass, and the distance measuring device malfunctioned, and the detected object distance is not the distance to the object of intent.

SUMMARY OF THE INVENTION

It is therefore an object of the invention to provide an improved finder system with which, when the finder is provided separately from the photographing optical system, it is possible to know whether the intended object will be photographed in in-focus condition merely by viewing the finder field.

For the above object, according to an aspect of the invention, there is provided a finder system provided in a camera separately from a photographing optical system, comprising: a first objective optical system for forming a first image of an object, the first image being a real image; a second objective optical system for forming a second image of the object, the second image being a real image, the first and second objective optical systems being apart from each other by a predetermined base length; a light combining element that combines light passed through the first objective optical system and a part of light passed through the second objective optical system to superimpose a part of the second image with the first image within a field of view; an erecting optical system for erecting the first image and the part of the second image combined by the light combining element; an eyepiece optical system that directs light passed through the light combining element toward an eye of an observer; a light deflecting device that deflects a path of light from an object directed to the light deflecting device with respect to a path of light emerged from the second objective optical system, degree of coincidence of the part of the second image with respect to the first image being changed along the base length direction; a passive distance measuring device for detecting a distance to the object; and a controller which controls the light deflecting device such that the part of the second image and the first image of an object which is located at the distance detected by the passive distance measuring device coincide with each other.

According to another aspect of the invention, there is provided a finder system provided in a camera separately from a photographing optical system, comprising: a first objective optical system for forming a first image of an object, the first image being a real image; a second objective optical system for forming a second image of the object, the second image-being a real image, the first and second objective optical systems being apart from each other by a predetermined base length; a light combining element that combines light passed through the first objective optical system and a part of light passed through the second objective optical system to superimpose a part of the second image with the first image within a field of view; an erecting optical system for erecting the first image and the part of the second image combined by the light combining element; an eyepiece optical system that directs light passed through the light combining element toward an eye of an observer; a light deflecting device that deflects a path of light emerged from the second objective optical system to change degree of coincidence of the part of the second image with respect to the first image along the base length direction; an active distance measuring device for detecting a distance to the object; a controller which controls the light deflecting device such that the part of the second image and the first image of an object which is located at the distance detected by the active distance measuring device coincide with each other.

According to further aspect of the invention, there is provided a finder system provided in a camera separately from a photographing optical system, comprising: a first objective optical system for forming a first image of an object, the first image being a real image; a second objective optical system for forming a second image of the object, the second image being a virtual image, the first and second objective optical systems being apart from each other by a predetermined base length; an erecting optical system for erecting the first image formed by the first objective optical system; a light combining element that combines light passed through the first objective optical system to superimpose a part of the second image with the first image within a field of view; an eyepiece optical system that directs light passed through the light combining element toward an eye of an observer; a light deflecting device that deflects a path of light emerged from the second objective optical system to change degree of coincidence of the part of the second image with respect to the first image along the base length direction; a passive distance measuring device for detecting a distance to the object; and a controller which controls the light deflecting device such that the part of the second image and the first image of an object which is located at the distance detected by the passive distance measuring device coincide with each other.

According to still further aspect of the invention, there is provided a finder system provided in a camera separately from a photographing optical system, comprising: a first objective optical system for forming a first image of an object, the first image being a real image; a second objective optical system for forming a second image of the object, the second image being a virtual image, the first and second objective optical systems being apart from each other by a predetermined base length; an erecting optical system for erecting the first image formed by the first objective optical system; a light combining element that combines light passed through the first objective optical system to superimpose a part of the second image with the first image within a field of view; an eyepiece optical system that directs light passed through the light combining element toward an eye of an observer; a light deflecting device that deflects a path of light emerged from the second objective optical system to change degree of coincidence of the part of the second image with respect to the first image along the base length direction; an active distance measuring device for detecting a distance to the object; a controller which controls the light deflecting device such that the part of the second image and the first image of an object which is located at the distance detected by the active distance measuring device coincide with each other.

According to another aspect of the invention, there is provided a finder system provided for a camera, the finder system being provided separately from a photographing optical system of the camera, comprising: a first objective optical system for forming a virtual image of an object; a second objective optical system for forming a real image of the object, the first and second objective optical systems being apart from each other by a predetermined base length; an erecting optical system for erecting the real image formed by the second objective optical system; a light combining element that combines light passed through the first objective optical system and a part of light passed through the second objective optical system to form superimposed images on a predetermined area within a field of view; an eyepiece optical system that directs light passed through the light combining element toward an eye of an observer; a light deflecting device that deflects a path of light from an object which-is directed to the light deflecting device with respect to a path of light emerged from the second objective optical system to change degree of coincidence of the superimposed images along the base length direction; a passive distance measuring device for obtaining information related to a distance to the object; and a controller which controls the light deflecting device such that the superimposed images of an object whose distance is equal to the distance detected by the passive distance measuring device coincide with each other.

According to further aspect of the invention, there is provided a finder system provided for a camera, the finder system being provided separately from a photographing optical system of the camera, comprising: a first objective optical system for forming a virtual image of an object; a second objective optical system for forming a real image of the object, the first and second objective optical systems being apart from each other by a predetermined base length; an erecting optical system for erecting the real image formed by the second objective optical system; a light combining element that combines light passed through the first objective optical system and a part of light passed through the second objective optical system to form superimposed images on a predetermined area within a field of view; an eyepiece optical system that directs light passed through the light combining element toward an eye of an observer; a light deflecting device that deflects a path of light emerged from the second objective optical system to change degree of coincidence of the superimposed images along the base length direction; an active distance measurement device for obtaining information related to a distance to the object; and a controller which controls the light deflecting device such that the superimposed images of an object whose distance is equal to the distance detected by the active distance measuring device coincide with each other.

It is preferable that the light combining element is arranged between the first objective optical system and the eyepiece optical system.

Optionally, the finder system may include a frame displaying device which displays a lighting type bright frame within the field of view. The displaying device may include a lighting window, a frame mask, and a half mirror, light entered from the lighting window being passed through the frame mask, reflected by the half mirror and combined with light passed through one of the first objective optical system and the second objective optical system.

Further, the light deflecting device includes a rotatable mirror and a mirror driving system that drives the rotatable mirror to rotate. Alternatively, the light deflecting device may have a lens shifting system in which at least one lens included in the second objective optical system is made shiftable in a direction orthogonal to an optical axis of the second objective optical system.

DESCRIPTION OF THE ACCOMPANYING DRAWINGS

FIG. 3 shows an arrangement of optical elements together with a controlling system of a finder system according to a third embodiment of the invention;

DESCRIPTION OF THE EMBODIMENTS

Hereinafter, embodiments of the invention will be described with reference to the accompanying drawings. Six embodiments will be described. In each embodiment, a finder system is provided in a camera separately from a photographing optical system thereof. The camera employs an automatic focusing function, i.e., the finder system of the camera is provided with a distance measuring device to detect an object distance, and a focusing condition of the photographing optical system is adjusted in accordance with a signal output by the distance measuring device. The distance measuring device may be an active or a passive distance measuring device.

The finder system of each embodiment has a first and a second optical systems. The first or second optical system is a real image type optical system or a virtual image type optical system. Types of the first and second optical systems, and the distance measuring device for each embodiment are indicated below.

| Embodiment | 1st opt. svs. | 2nd opt. svs. | DMD |
|---|---|---|---|
| First | Real Image | Real Image | Passive |
| Second | Real Image | Real Image | Active |
| Third | Real Image | Virtual Image | Passive |
| Fourth | Real Image | Virtual Image | Active |
| Fifth | Virtual Image | Real Image | Passive |
| Sixth | Virtual Image | Real Image | Active |

In the above table, "opt. sys." denotes an "optical system", and "DMD" denotes a "distance measuring device."

[First Embodiment]

Figure 1A:
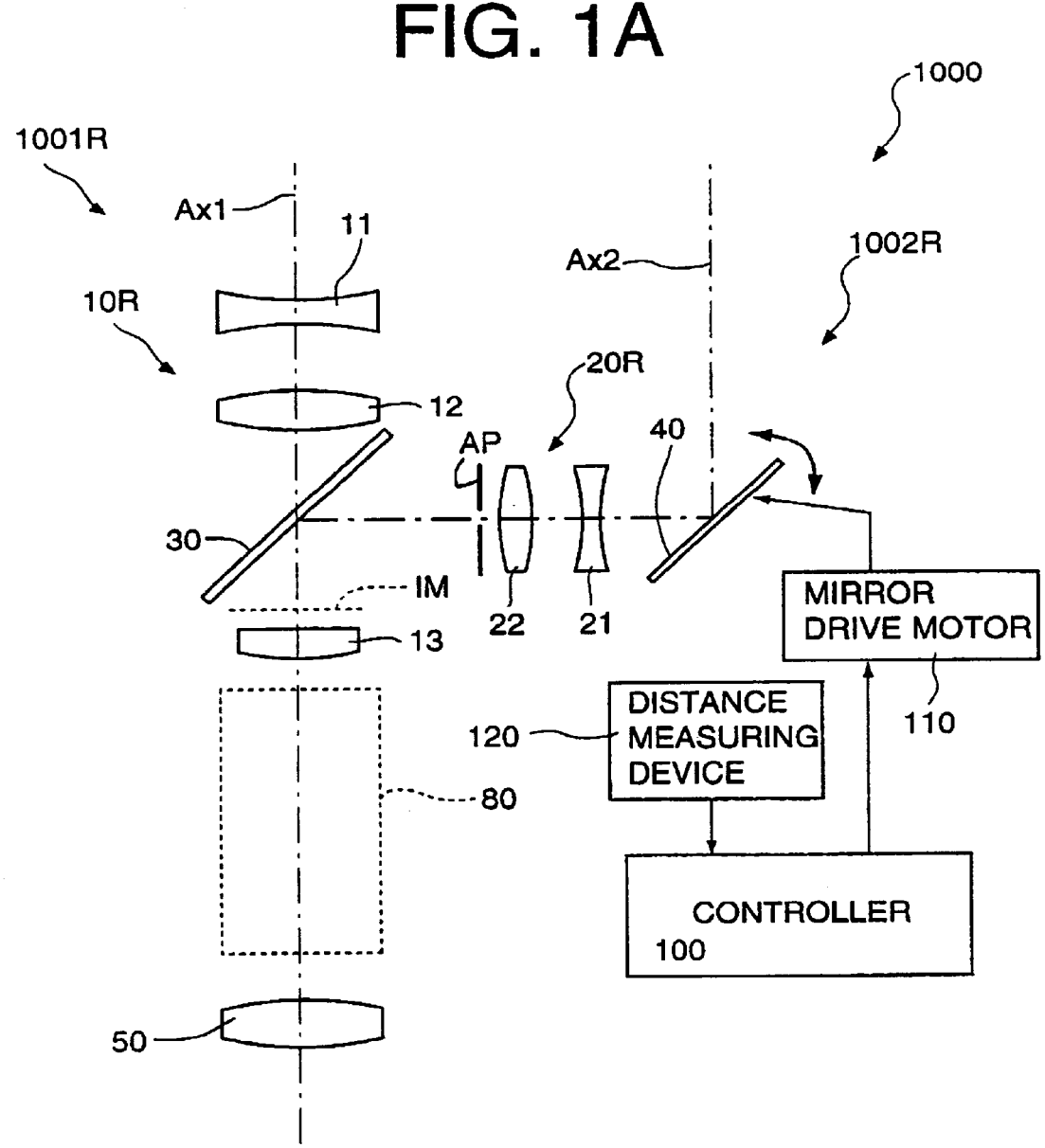
FIG. 1A shows an arrangement of optical elements together with a controlling system of a finder system according to a first embodiment of the invention.

FIG. 1A shows an arrangement of optical elements, together with a controlling system, of a finder system 1000 according to a first embodiment of the invention.

The finder system 1000 is provided in a camera (not shown) separately from a photographing optical system (not shown) of the camera. The camera employs an automatic focusing function. In the first embodiment, the finder system 1000 is provided with a passive type distance measuring device 120, and the photographing lens (not shown) is moved to focus on an object in accordance with a signal output from the distance measuring device 120.

The finder system 1000 is provided with a real image type first optical system 100R, and a real image type second optical system 1002R.

The first optical system 1001R is a Keplerian finder including an first objective optical system 10R which forms a real image of an object on an image plane IM, a condenser lens 13, an erecting prism 80, and an eyepiece lens 50. The erecting prism 80 is shown as developed in FIG. 1A. The first objective optical system 10R includes a negative lens 11 and a positive lens 12.

The second optical system 1002R includes a rotatable mirror 40 and a second objective optical system 20R. The second objective optical system 20R receives light reflected by the rotatable mirror 40 and forms a real image of the object on a plane substantially the same as the image plane IM. An aperture AP is defined within an optical path of the second optical system 1002R such that a part of light incident on the second objective optical system 20R is directed toward the eyepiece eyepiece lens 50, and that the image formed by the second objective optical system 20R is formed in a predetermined area (e.g., a central area) within the finder field. It should be noted that the area of the image formed by the second objective optical system 20R within the finder field is relatively small with respect to the size of the finder field. The second objective optical system 20R includes a negative lens 21 and a positive lens 22.

In FIG. 1A, Ax1 denotes an optical axis of the first optical system 1001R, and Ax2 denotes an optical axis of the second optical system. As shown in FIG. 1A, the first and second optical axes Ax1 and Ax2 are apart by a predetermined base length so that the first and second optical systems 1001R and 1002R view an object at different viewing angles. It should be noted that the optical axis Ax2 of the second optical system 1002R is bent by the rotatable mirror 40.

Light entered through the first objective optical system 10R and a part of light entered through the second objective optical system 20R are combined by the light combining element, or a half mirror 30 provided between the first objective optical system 10 and the erecting prism 80. It should be noted that, only a part of light passed through the second objective optical system 20R is incident on the half mirror 30 due to the aperture AP provided in the second optical system 1002R.

The images which are formed on the image plane IM by the first and second objective optical systems 10R and 20R are reversed images, and are erected by the erecting prism 80 before directed to the eye of a user through the eyepiece lens 50.

Light entered through the first objective optical system 10R forms an image covering substantially all the area of the finder field. A part of the light entered through the first objective optical system 10R passes through the half mirror 30, and reaches the user's eye through the condenser lens 13, the erecting prism 80 and the eyepiece lens 50.

As for light entered through the second objective optical system 20R, only a part of light corresponding to the central area of the finder field passes through the aperture AP, reflected by the half mirror 30, passes through the condenser lens 13, the erecting prism 80 and the eyepiece lens 50, and reaches the user's eye.

With this structure, the user is capable of viewing an image corresponding to the entire area of the finder field, and, at the central area of the finder field, superimposed two images. The image corresponding to the entire area of the finder field is formed by the first objective optical system 10R, and the second objective optical system 20R forms an image, which is superimposed on the image formed by the first objective optical system 10R, at the predetermined area of the finder field. Hereinafter, the area on which two images are superimposed is referred to as a superimposed image area.

Degree of coincidence of the two images at the superimposed image area, i.e., the central area of the finder field varies depending on an angle of rotation of the rotatable mirror 40.

In the first embodiment, the distance measuring device 120 is connected to the controller 100. The controller 100 drives a mirror drive motor 110, which is a stepping motor, in accordance with an output signal of the distance measuring device 120. As the mirror 40 is driven to rotate, an angle formed between the optical axes Ax1 and Ax2 changes, and accordingly, the degree of coincidence of the superimposed images at the superimposed image area of the finder field varies in a direction parallel to the base length.

An example of the passive type distance measuring device 120 may have a pair of imaging lenses arranged such that optical axes thereof extend in parallel, and a pair of line sensors for receiving images formed by the pair of imaging lenses, respectively. Based on a phase difference of images formed on the pair of line sensors, the object distance can be determined.

The object distance obtained with use of the distance measuring device 120 is used for bringing a photographing lens to an in-focus condition with respect to an object.

Further, the controller 100 determines a rotation angle of the rotatable mirror 40 based on the obtained object distance. Specifically, the controller 100 determines the rotation amount of the rotatable mirror 40 such that two superimposed images of an object which is located at a distance equal to the obtained object distance coincide with each other. In other words, the optical axes Ax1 and Ax2 intersect at a point whose distance is the same as the obtained object distance. Then, the controller 100 controls the mirror drive motor 110 to rotate the rotatable mirror 40 by the determined amount.

Accordingly, it is possible for the user to know whether an object of intent can be photographed in in-focus state in accordance with the degree of coincidence of the superimposed two images in the finder field. If the superimposed images of the object of intent do not coincide, the obtained distance is not the distance to the intended object. In such a case, by carrying out the distance measurement repeatedly, it may be finally possible to obtain the in-focus condition with respect to the object of intent.

It should be noted that, in the first embodiment, the rotatable mirror 40 is utilized to change the degree of superimposition of the two images. However, various alternatives for changing the degree of coincidence of the superimposed images. For example, by arranging at least one of the lenses of the second objective optical system 20 such that an optical axis of at least one lens is displaced with respect to the optical axis Ax2 of the entire second optical system 1002R in a direction perpendicular to the optical axis Ax2, substantially the same effect can be obtained.

Figure 1B:
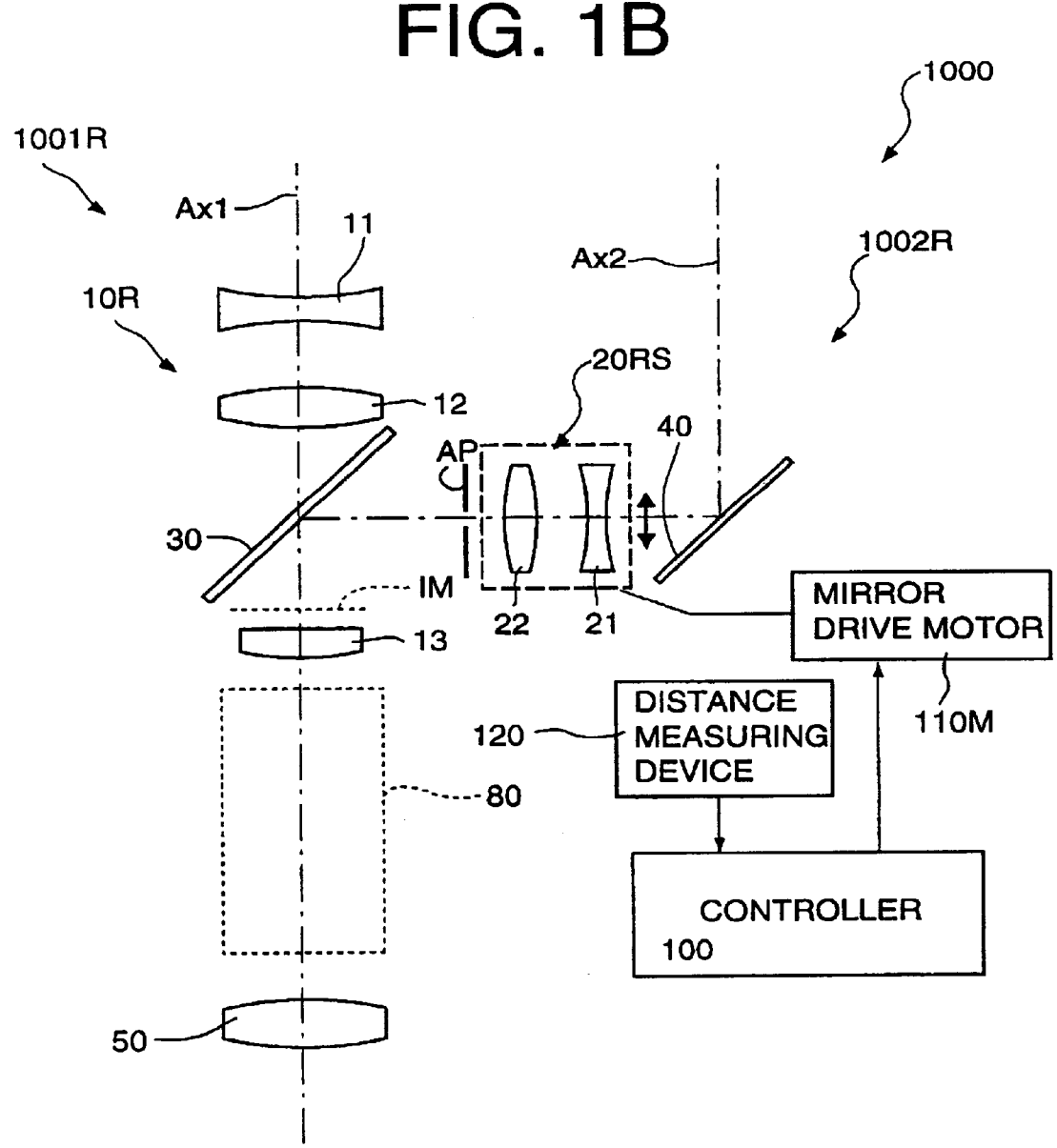
FIG. 1B shows a modification of the first embodiment.

FIG. 1B shows an example of an arrangement of the optical elements according to a modification of the first embodiment. The modification shown in FIG. 1B is similar to the first embodiment shown in FIG. 1A except that the mirror 40 is not rotatable, and an objective optical system 20RS including the lenses 21 and 22 are made shiftable in a direction indicated by arrow (in a direction perpendicular to the optical axis of the second objective optical system 20RS and on a plane including the optical axes Ax1 and Ax2. The lenses 21 and 22 are driven by a lens drive motor 110M which is controlled by the controller 100 in accordance with the output signal of the distance measuring device 120. It should be noted that, although two lenses are made shiftable in this modification, similar effect can be obtained by shifting at least one of the lenses included in the objective optical system 20RS.

Alternatively, with use of a variable apex angle prism, a similar effect can also be achieved.

It should be noted that above-described modification, i.e., usage of a shiftable lens instead of the rotatable mirror, can also be applied to the other embodiments described hereinafter, and various possible modifications thereof.

[Second Embodiment]

Figure 2:
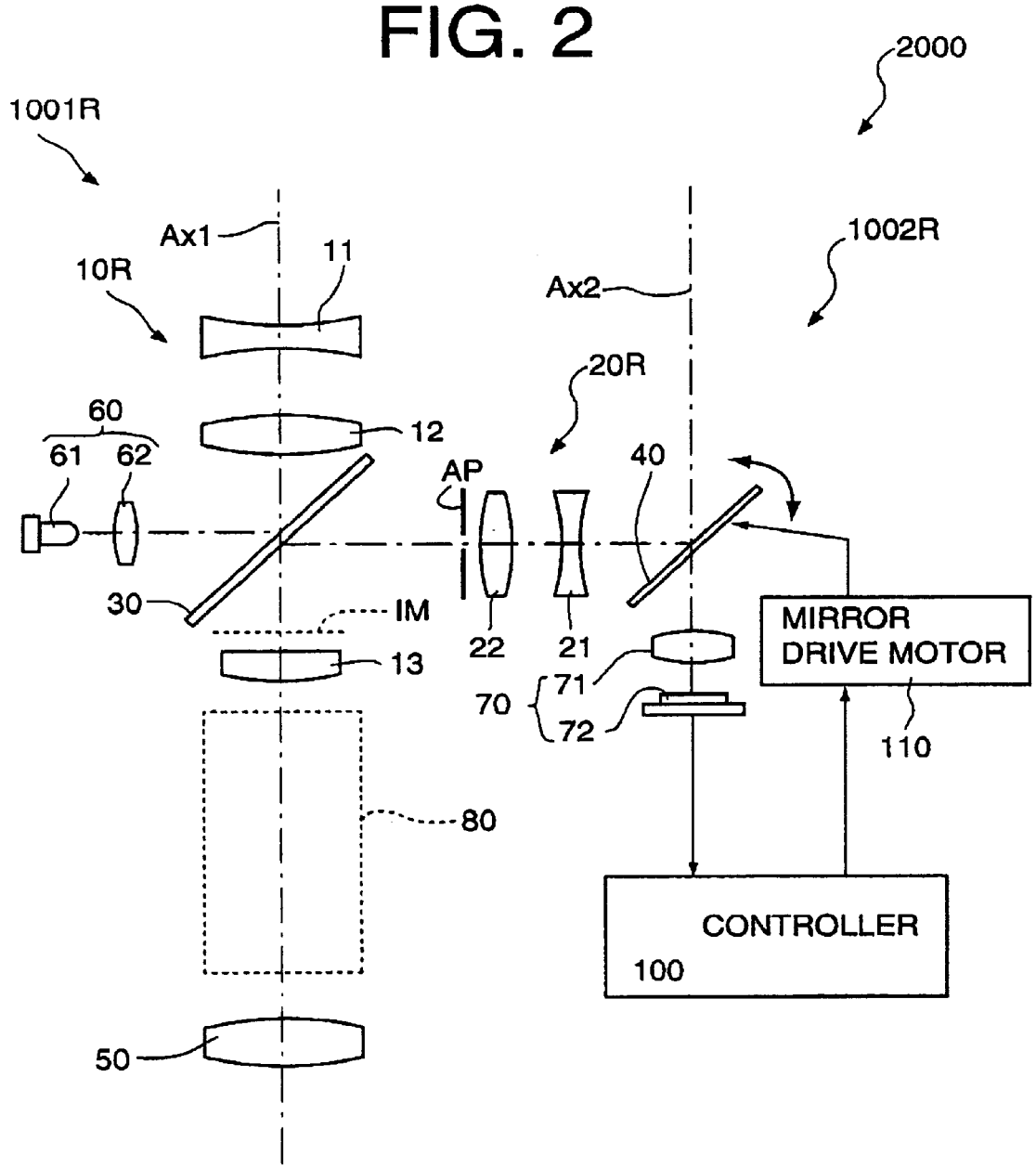
FIG. 2 shows an arrangement of optical elements together with a controlling system of a finder system according to a second embodiment of the invention.

FIG. 2 shows an arrangement of optical elements, together with a controlling system, of a finder system 2000 according to a second embodiment of the invention. The finder system 2000 is similar to the finder system 1000 except that the finder system 2000 employs an active distance measuring device, which will be described later, instead of the passive distance measuring device 120 of the first embodiment.

In the second embodiment, the finder system 2000 is provided separately from a photographing optical system (not shown) of a camera (not shown).

Similarly to the first embodiment, the finder system 2000 is provided with the real image type first optical system 1001R, and the real image type second optical system 1002R. Since the structure and function of the optical systems are similar to those in the first embodiment, description thereof will be omitted.

An example of the active type distance measuring device will be described with reference to FIG. 2.

The active type distance measuring device includes a light emitting system 60 provided with:

an infrared light emitting diode 61 and light projecting lens 62; and a light receiving system 70 including a light receiving lens 71 and a PSD (Position Sensitive Device) 72.

The light emitting system 60 emits infrared light for detection via at least one of the lenses of the first objective optical system 10. The light emitting system 60 emits the light via the half mirror 30 and the lenses 11 and 12 toward the object.

The light receiving system 70 receives light which is emitted by the light emitting system 60 and reflected by the object.

In this embodiment, the rotatable mirror 40 is formed as a half mirror, and light passed through the half mirror 40 is received by the PSD 72 through the lens 71. Since the light used for distance measuring is the infrared light, it is preferable that the mirror 40 is a dichroic mirror by which visual light is reflected, and only the infrared light is allowed to pass through. Light passed through the rotatable mirror 40 is converged on the PSD 72 via the lens 71. The PSD 72 is an element which detects a center of light intensity distribution of a converged light incident thereon. Application of the PSD is described, for example, in the U.S. Pat. No. 4,983,033, and accordingly, the detailed description thereof will be omitted in this specification.

The controller 100 which is connected to the PSD 72 detects a position of a converged point based on the output signals of the PSD 72, and determines the object distance in accordance with a triangular distance determining method.

In accordance with thus obtained object distance, the controller 100 determines a rotation angle of the rotatable mirror 40 and drives the mirror drive motor 110 such that the rotatable mirror 40 is rotated by the determined amount.

The object distance is also used for bringing the photographing lens to an in-focus condition with respect to an object.

[Third Embodiment]

FIG. 3 shows an arrangement of optical elements, together with a controlling system, of a finder system 3000 according to a third embodiment of the invention.

Similar to the other embodiments, the finder system 3000 is provided separately from a photographing optical system (not shown) of a camera (not shown). The camera has an automatic focusing function, and the finder system 3000 is provided with a passive type distance measuring device 120. The photographing optical system is brought into in-focus condition in accordance with a signal output from the distance measuring device 120.

The finder system 3000 is provided with a real image type first optical system 100R, and a virtual image type second optical system 1002V.

The first optical system 1001R is a Keplerian finder including an first objective optical system 10R which forms a real image of an object on an image plane IM, a condenser lens 13, an erecting prism 80, and an eyepiece lens 50. It should be noted that the erecting prism 80 is shown as developed in FIG. 3. The first objective optical system 10R includes a negative lens 11 and a positive lens 12.

The second optical system 1002V includes a rotatable mirror 40 and a second objective optical system 20V. The second objective optical system 20V receives light reflected by the rotatable mirror 40 and forms a virtual image of the object. An aperture AP is provided within an optical path of the second optical system 1002V such that the image formed by the second objective optical system 20 is viewed in a predetermined area (i.e., the superimposed image area) within the finder field. The second objective optical system 20V consists of a negative lens 21 and a positive lens 22. It should be noted that, in the third embodiment, the first objective optical system 10R and the second objective optical system 20V are configured such that the image planes of the first and second objective optical systems 10R and 20V viewed from the eyepiece lens 50 are substantially the same.

In FIG. 3, Ax1 denotes an optical axis of the first optical system 1001R, and Ax2 denotes an optical axis of the second optical system 1002V. As shown in FIG. 3, the first and second optical axes Ax1 and Ax2 are apart by a predetermined base length so that the first and second optical systems 1001R and 1002V view an object at different viewing angles. It should be noted that the optical axis Ax2 of the second optical system 1002V is bent by the rotatable mirror 40.

Light entered through the first objective optical system 10R and a part of light entered through the second objective optical system 20V are combined by the light combining element, or a half mirror 81 which is formed on one reflection surface of the erecting prism 80. It should be noted that the light combining element should be provided between the image plane IM of the first objective optical system 10R and the eyepiece lens 50.

The image which is formed on the image plane IM by the first objective optical systems 10R is a reversed image, and is erected by the erecting prism 80 before directed to the eye of a user's eye through the eyepiece lens 50.

Light entered through the first objective optical system 10R forms an image covering substantially all the area of the finder field. A part of the light entered through the first objective optical system 10R passes through the aperture AP, the condenser lens 13 and is incident on the erecting prism 80. The light further passes through the half mirror surface 81, and is emerged from the erecting prism 80 and reaches the user's eye through the eyepiece lens 50.

As for light entered through the second objective optical system 20V, only a part of light corresponding to the central area of the finder field passes through the aperture AP, reflected by the half mirror 81, passing through the eyepiece lens 50, and reaches the user's eye.

With this structure, the user is capable of viewing an image corresponding to the entire area of the finder field, and, at the central area of the finder field, superimposed images. The image corresponding to the entire area of the finder field is formed by the first objective optical system 10R, and the central portion of the image formed by the light passed through the first objective optical system 10R and the image formed by the light passed through the second objective optical system 20V form the superimposed images.

Degree of coincidence of the superimposed images at the superimposed image area of the finder field varies depending on an angle of rotation of the rotatable mirror 40.

In the third embodiment, similar to the first embodiment, the distance measuring device 120 is connected to the controller 100. The controller 100 drives the mirror drive motor 110 in accordance with an output signal of the distance measuring device 120.

[Fourth Embodiment]

Figure 4A:
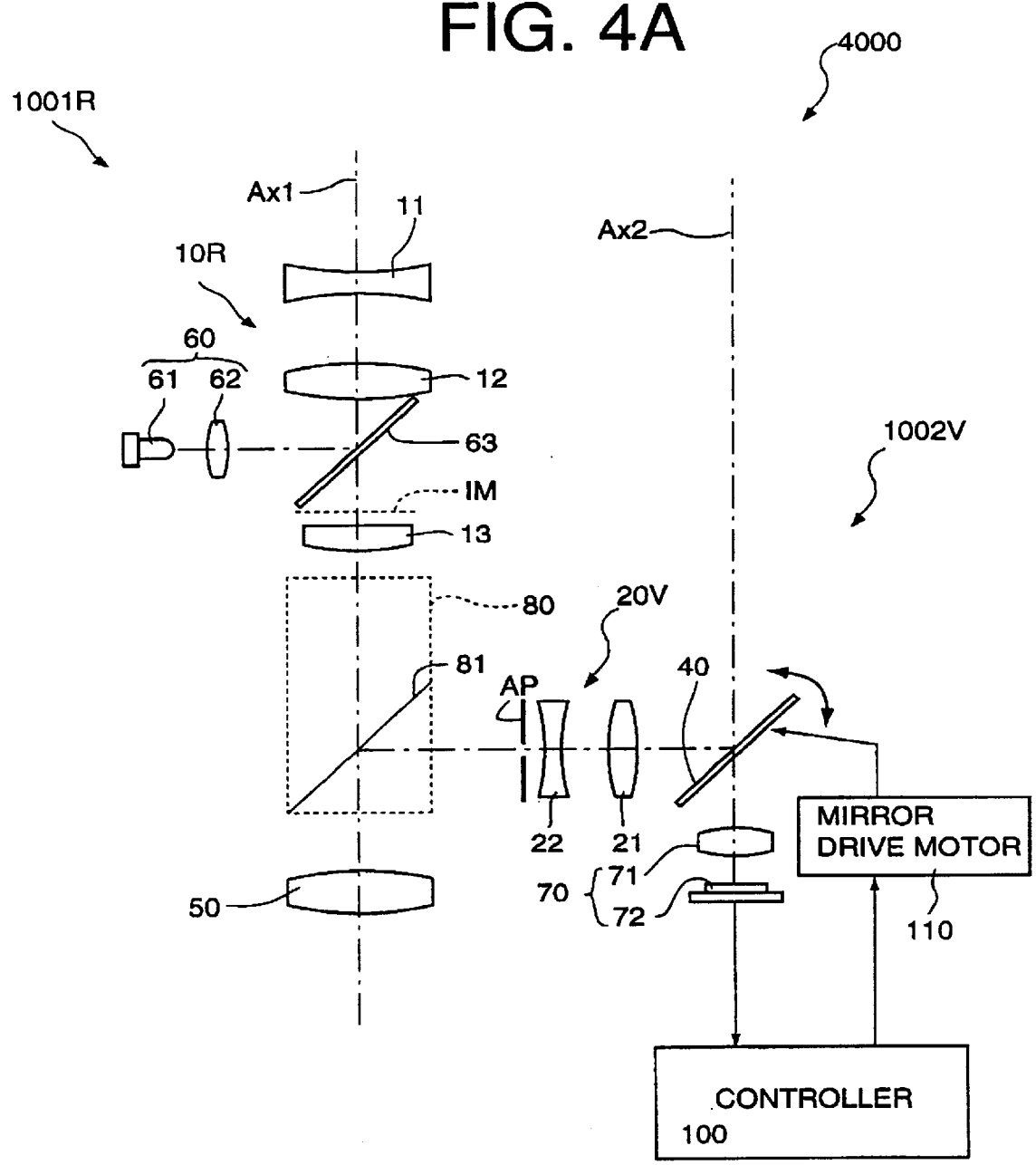
FIG. 4A shows an arrangement of optical elements together with a controlling system of a finder system according to a fourth embodiment of the invention.

FIG. 4A shows an arrangement of optical elements, together with a controlling system, of a finder system 4000 according to a fourth embodiment of the invention. The finder system 4000 is similar to the finder system 3000 except that the finder system 4000 employs the active distance measuring device, which is similar to that employed in the second embodiment, instead of the passive distance measuring device 120 of the third embodiment.

The active type distance measuring device will be described with reference to FIG. 4A.

The active type distance measuring device includes a light emitting system 60 provided with:

a infrared light emitting diode 61, a light projecting lens 62 and a half mirror 63; and a light receiving system 70 including a light receiving lens 71 and a PSD (Position Sensing Device) 72.

The light emitting system 60 emits infrared light for detection via at least one of the lenses of the first objective optical system 10. In the fourth embodiment, the infrared light emitted by the light emitting diode 61 passes through the light projecting lens 62, and is reflected by the half mirror 63 toward an object, via the half mirror 63 and the lenses 11 and 12.

The light receiving system 70 receives light which is emitted by the light emitting system 60 and reflected by the object. Specifically, the rotatable mirror 40 is formed as a half mirror, and light passed through the half mirror 40 is received by the PSD 72 through the lens 71. Since the light used for distance measuring is the infrared light, it is preferable that the mirror 40 is a dichroic mirror by which visual light is reflected, and allows only the infrared light to pass through. Light passed through the rotatable mirror 40 is converged on the PSD 72 via the lens 71.

The controller 100 detects a position of a converged point based on output of the PSD 72, and then determines the object distance in accordance with a triangular distance determining method.

Figure 4B:
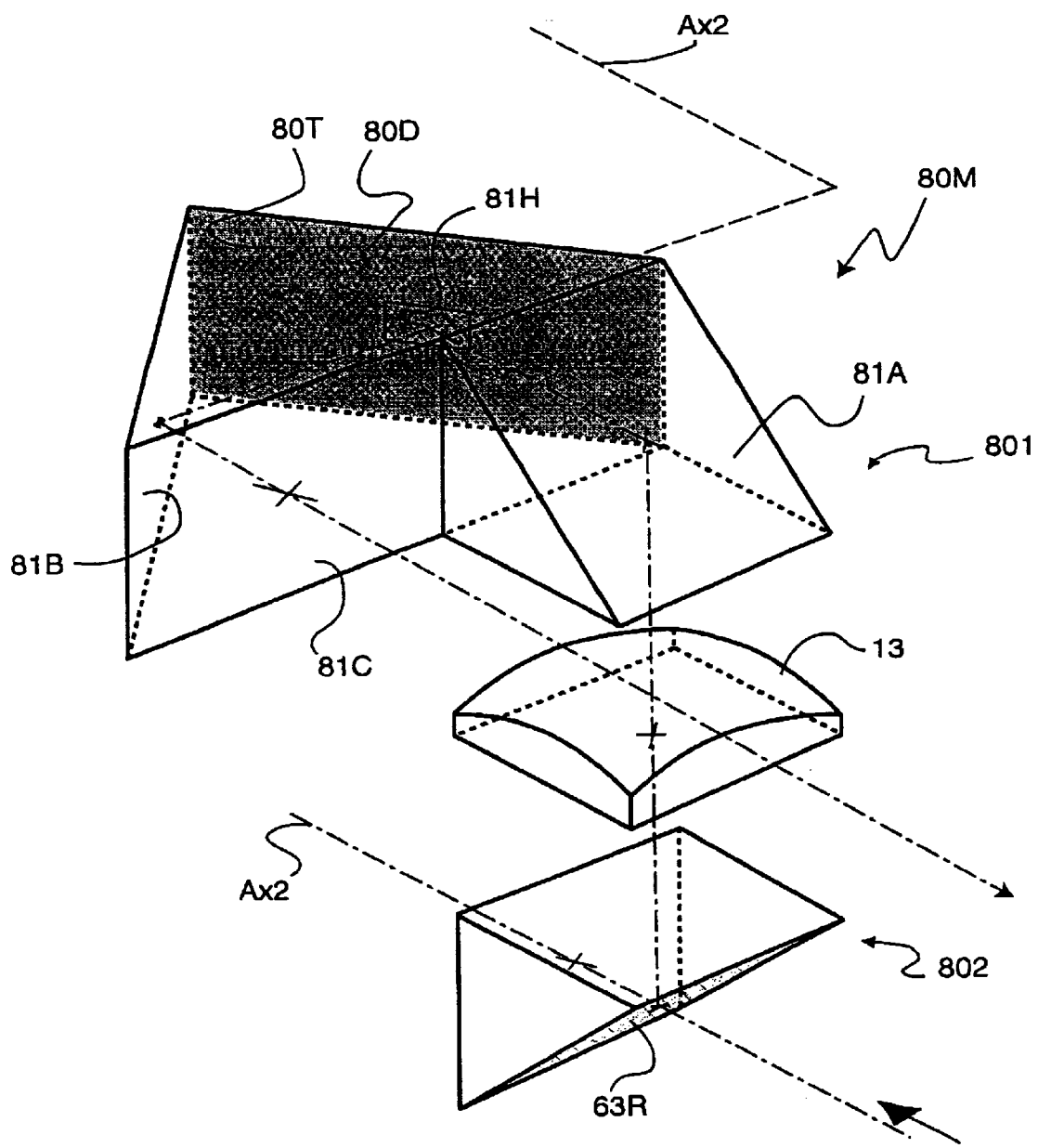
FIG. 4B shows an enlarged view of an erecting prism of a modified fourth embodiment.

FIG. 4B shows an erecting prism 80M of a modification of the second embodiment. The structure of the finder system according to this modification is substantially similar to the above-described fourth embodiment, except that the arrangement of the optical elements with respect to the erecting prism 80M is different.

The erecting prism 80M consists of a first prism 801 and a second prism 802, and the condenser lens 13 is arranged therebetween.

In the modification shown in FIG. 4B, the infrared light emitted by the active distance measuring device 60 proceeds by way of a half mirror 63R. It should be noted that the half mirror 63R is a surface of the second prism 802 of the erecting prism 80M.

The light emitted by the light emitting system 60 and passed through the half mirror surface 63R of the second prism 802 proceeds, along the optical axis Ax2, towards an object. The light emitted by the light emitting system 60 and reflected by the object is received by the light receiving system 70, similarly to the above-described fourth embodiment.

Light from the object and proceeds along the optical axis Ax1 is reflected by the halt mirror surface 63R, refracted by the condenser lens 13, reflected by a reflecting surface 81A, by an inner surface of the plane 81D, by a reflecting surface 81B, and then directed to the eyepiece lens 50. The outer surface of the plane 81D corresponding to the portion 81T is painted such that a portion 81T shield the light. Further, the portion 81H is formed to be a half mirror. Preferably, the inner surface of the portion 81T is a total reflection surface. With this structure, the light incident on the inner surface of the plane 81D is substantially totally reflected.

Light from the object and proceeds along the optical axis Ax2 is passed through only the half mirror portion 81H of the plane 81D, since the portion 81T does not allow light to pass through.

In the above-described modification, the plane 81D functions as the aperture AP for limiting an area of light directed from the second objective optical system 20V towards the eyepiece lens 50. Further, the inner surface of the plane 81D functions as a mirror surface.

[Fifth Embodiment]

Figure 5:
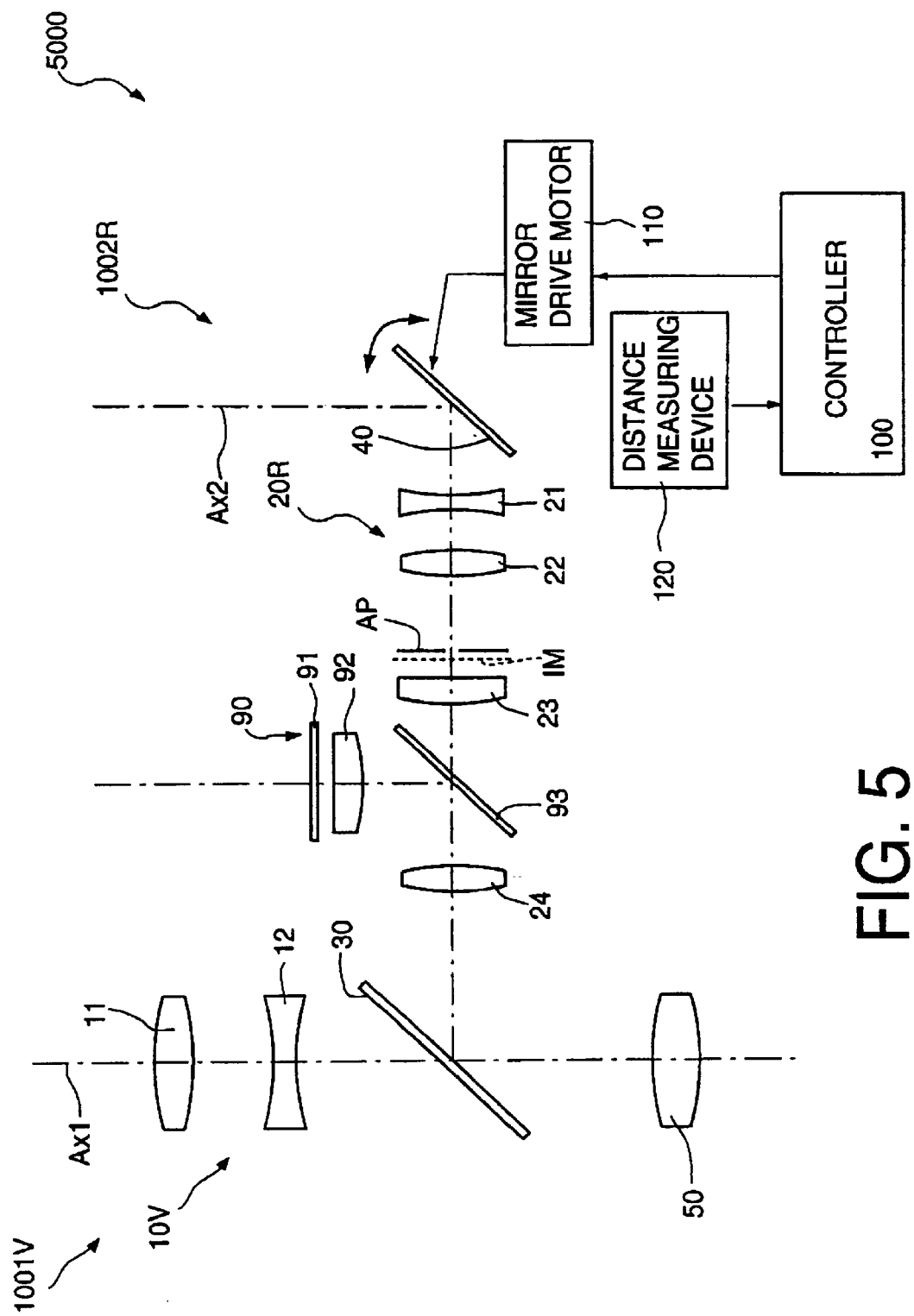
FIG. 5 shows an arrangement of optical elements together with a controlling system of a finder system according to a fifth embodiment of the invention.

FIG. 5 shows an arrangement of optical elements, together with a controlling system, of a finder system 5000 according to a fifth embodiment of the invention.

The finder system 5000 is provided in a camera separately from a photographing optical system (not shown). The camera has an automatic focusing function. The finder system 5000 is provided with a passive type distance measuring device 120, and the photographing lens (not shown) is brought into in-focus condition in accordance with a signal output from the distance measuring device.

The finder system 5000 is provided with a virtual image type first optical system 1001V, and a real image type second optical system 1002R.

The first optical system 1001V is a reversed-Galilei type finder including a first objective optical system 10V which forms a virtual image of an object, and an eyepiece lens 50. The first objective optical system 10V includes a negative lens 11 and a positive lens 12.

The second optical system 1002R includes a second objective optical system 20R, a condenser lens 23 and a relay lens 24. The second objective optical system 20R receives light reflected by the rotatable mirror 40 and forms a real image of the object on an image plane IM. The second objective optical system 20R includes a negative lens 21 and a positive lens 22.

In FIG. 5, Ax1 denotes an optical axis of the first optical system 1001V, and Ax2 denotes an optical axis of the second optical system 1002R. The first and second optical axes Ax1 and Ax2 are apart by a predetermined base length so that the first and second optical systems view an object at different viewing angles. The optical axis Ax2 of the second optical system 1002R is bent by the rotatable mirror 40.

The image which is formed on the image plane IM by the second objective optical system 20R is a reversed image, and is erected by the relay lens 24 which functions as an erecting optical system.

At the image plane IM or closely adjacent to the image plane IM, an aperture AP is defined so that part of light passed through the second objective optical system 20R, which forms an image within a central part of the image plane, is directed towards the first optical system 1001V.

Light enters through the first and second objective optical systems 10V and 20R is combined by a half mirror 30 which is provided between the first objective optical system 10V and the eyepiece lens 50.

Light entered through the first objective optical system 10V forms an image covering all the area of the finder field. A part of the light directed through the first objective optical system 10V passes through the half mirror 30, and reaches a user's eye through the eyepiece lens 50.

As for light entered through the second objective optical system 20R, only a part of light which forms an image within the central area of the finder field passes through the aperture AP, is reflected by the half mirror 30, passes through the eyepiece lens 50 and reaches the user's eye.

With this structure, the user is capable of viewing a superimposed two images at the central area (i.e., the superimposed image area) of the finder field. The image corresponding to the other area of the finder field is formed by the light entered through the first objective optical system 10.

Degree of coincidence of the superimposed two images viewed on the superimposed image area within the finder field varies depending on an angle of rotation of the rotatable mirror 40.

The controller 100 drives a mirror drive motor 110, which is a stepping motor, in accordance with an output signal of the distance measuring device 120. As the mirror 40 is driven to rotate, an angle formed between the optical axes Ax1 and Ax2 changes, and accordingly, the degree of coincidence of the superimposed images varies along a direction of the base length.

Similar to the other embodiments, the controller 100 determines a rotation angle of the rotatable mirror 40 based on the obtained object distance.

The object distance is also used for bringing a photographing lens to an in-focus condition with respect to an object.

Further to the above feature, in this embodiment, a frame displaying device 90 is provided for displaying a bright frame within the field of view. That is, the finder optical system 5000 is formed as a lighting type bright frame finder.

The frame displaying device 90 receives light entered from a lighting window which is formed between windows for introducing light for the first and second objective optical systems 10V and 20R, and passed through a frame mask 91 and a condenser lens 92. The finder optical system 5000 combines, with use of a half mirror 93, the light entered from the lighting window and light entered through the second objective optical system 20R.

The frame mask 91 is constituted such that, on an opaque plate, a transparent frame pattern is formed. The frame mask 91 is located at a position that is equivalent with respect to the image plane IM of the second objective optical system 20R.

Light combined by the half mirror 93, which is located between the condenser lens 23 and the relay lens 24, is reflected by the half mirror 30 and is incident on the eyepiece lens 50. Light entered through the second objective optical system 20R is also reflected by the half mirror 30 and incident on the eyepiece lens 50. Accordingly, the user views the bright frame as superimposed on the object image which includes the superimposed images described above.

The frame displaying system 90 is not limited to the lighting type, but an Albada-type finder system may be utilized. When the Albada-type finder system is used, for example, a field frame pattern formed of metal is provided on the inner side of the negative lens 11 of the first objective optical system 10V. Light reflected by the field frame pattern is further reflected on the inner surface of the negative lens 11 and viewed as a viewed by the user as the finder frame.

[Sixth Embodiment]

Figure 6:
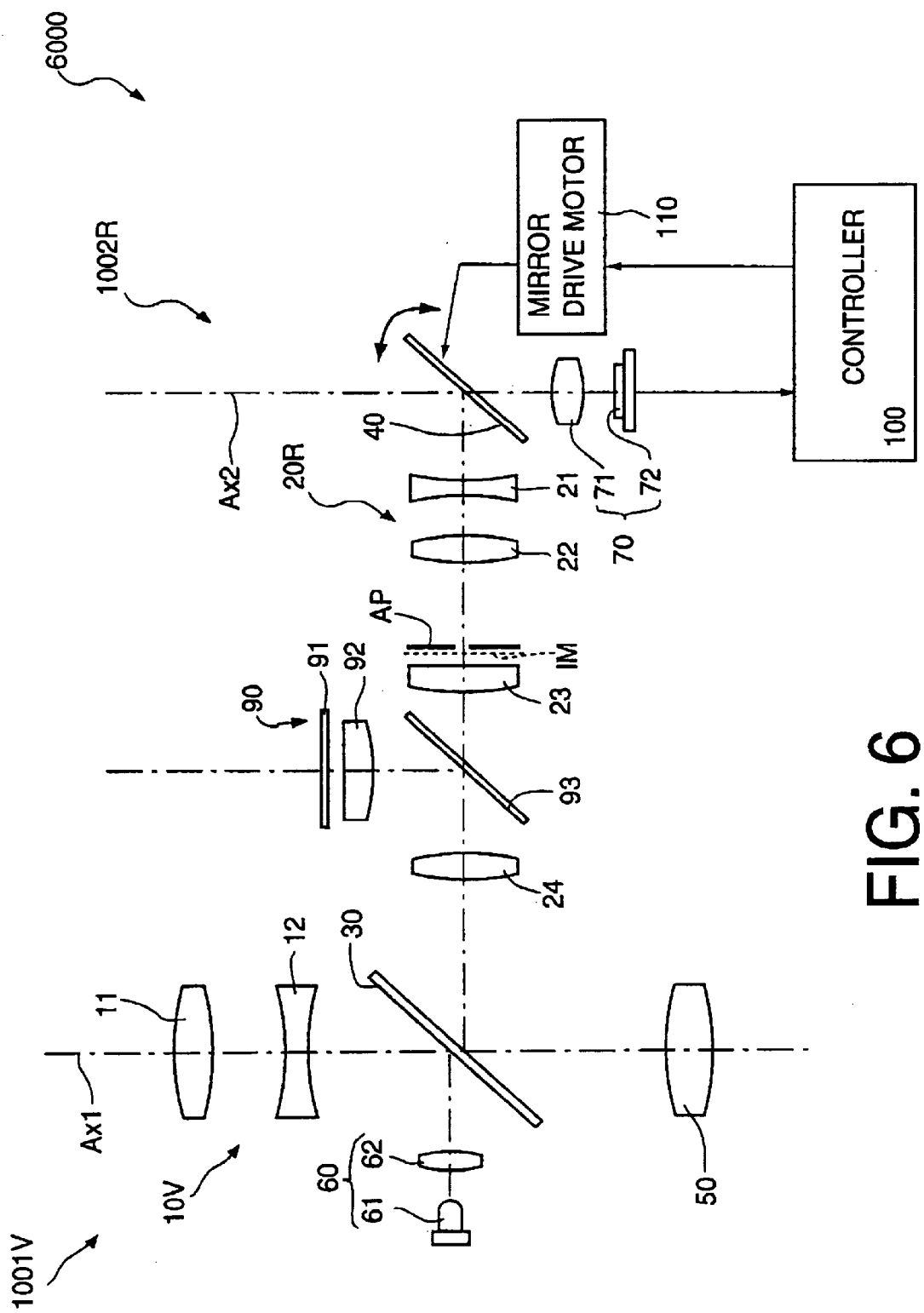
FIG. 6 shows an arrangement of optical elements together with a controlling system of a finder system according to a sixth embodiment of the invention.

FIG. 6 shows an arrangement of optical elements, together with a controlling system, of a finder system 6000 according to a sixth embodiment of the invention. The finder system 6000 is similar to the finder system 5000 except that the finder system 6000 employs the active distance measuring device, which is similar to that employed in the second and fourth embodiments, instead of the passive distance measuring device 120 of the fifth embodiment.

The active type distance measuring device employed in the finder system 6000 includes a light emitting system 60 including an infrared light emitting diode 61, and a light receiving system 70 including a light receiving lens 71 and a PSD (Position Sensing Device) element 72.

The light emitting system 60 emits light for detection via at least one lens of the first objective optical system 10V. The light emitting system 60 emits the light via the half mirror 30 and the lenses 11 and 12.

The light receiving system 70 receives light which is emitted by the light emitting system 60 and reflected by an object. In this embodiment, the rotatable mirror 40 is formed as a half mirror, and light passed through the half mirror 40 is received by the PSD element 72 through the lens 72. Since the light used for distance measuring is the infrared light, it is preferable that the mirror 40 is a dichroic mirror by which visual light is reflected, and the infrared light is passed through. Light passed through the rotatable mirror 40 is converged on the PSD element 72 via the lens 71.

The PSD 72 is an element which detects a center of light intensity distribution of light incident thereon. The controller 100 which is connected to the PSD 72 detects a position of a converged point based on the output signals of the PSD 72, and determines the object distance in accordance with a triangular distance determining method.

In the sixth embodiment, similarly to the fifth embodiment, a frame displaying device 90 is provided for displaying a bright frame within the field of view. That is, the finder optical system 6000 is formed as a lighting type bright frame finder.

The above-described sixth embodiment can be modified in various ways.

In the embodiment, the light emitting system 60 emits light through the first objective optical system 10V. This can be modified such that the light emitting system 60 is provided at a position opposite to the frame mask 91 with respect to the half mirror 93. In this case, through a transparent portion formed at a central portion of the frame mask 91, light used for distance measurement may be emitted toward the object.

It should be noted that, in the first to sixth embodiment and modifications, the rotatable mirror 40 is utilized to change the degree of coincidence of the superimposed images viewed within the superimposed image area. However, various alternatives for changing the degree of coincidence of the superimposed images. As described with reference to FIG. 1B, by arranging at least one of the lenses of the second objective optical system such that an optical axis of at least one lens is displaced with respect to the optical axis Ax2 in a direction perpendicular to the optical axis Ax2, substantially the same effect can be obtained. Alternatively, with use of a variable apex angle prism, a similar effect can be achieved.

Further, instead of using the passive or active distance measuring device, it may be possible to use a focusing condition detection device which detects a focusing condition, i.e., a defocus amount with respect to an object. In such a case, the controller may determine the object distance based on the detected defocus amount, a current position of the photographing lens (focusing lens), and a focal length of the photographing lens. Specifically, the object distance can be obtained in accordance with the equation below:

Object Distance=$DF/f^2$ where, DF denotes the defocus amount when the focusing lens focuses on an object at infinity, and f denotes the focal length of the photographing lens.

Figures 7A, 7B, 7C:
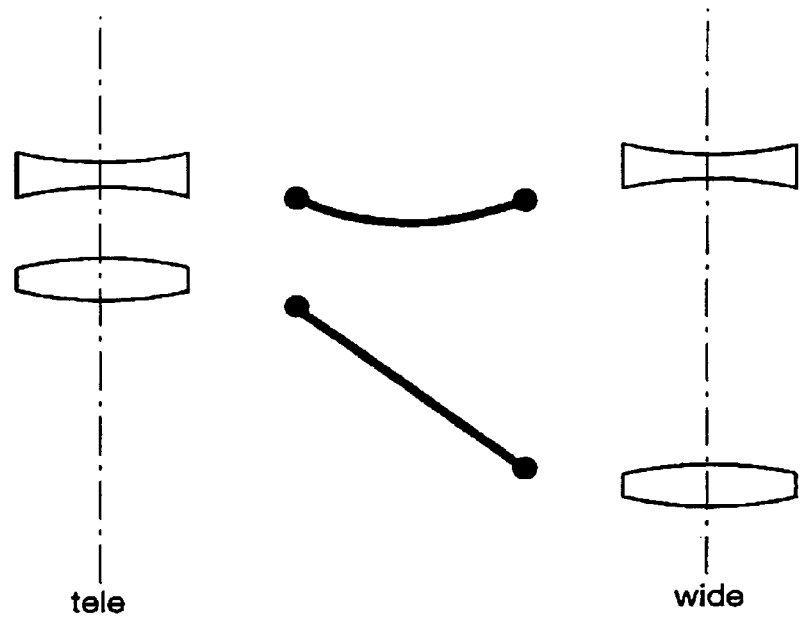
FIGS. 7A–7C show movement of lenses of a real image type objective optical system when magnification is changed.
Figures 8A, 8B, 8C:
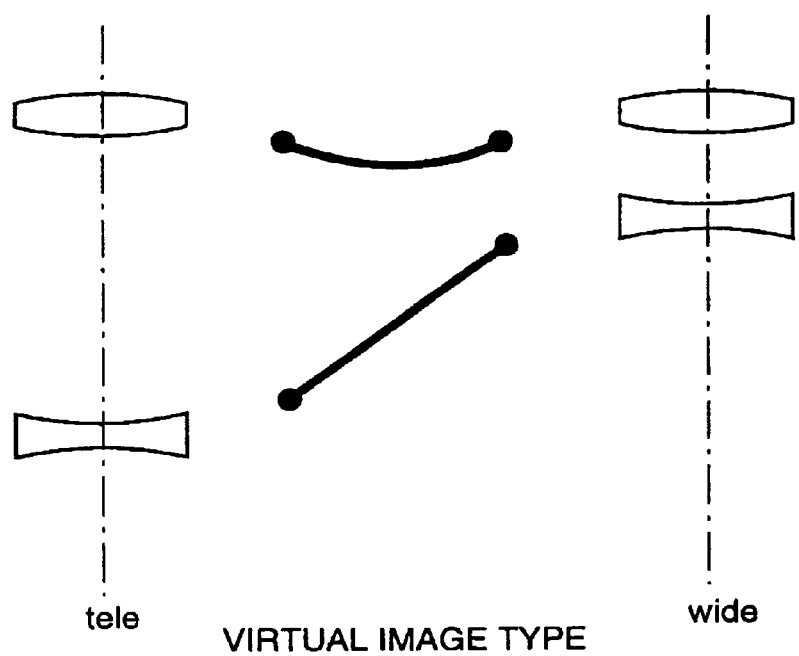
FIGS. 8A–8C show movement of lenses of a virtual image type objective optical system when magnification is changed.

Optionally, if the photographing optical system is constituted by a lens whose focal length is changeable, e.g., a zoom lens, it is preferable that the first and second objective optical systems are constituted as lens systems whose focal length is changeable in accordance with the focal length of the photographing lens. FIG. 7A–C and 8A–8C respectively show changes of focal length of a real image type objective optical system (FIGS. 7A–7C) and a virtual image type objective optical system (FIGS. 8A–8C). FIGS. 7A and 8A show positions of lenses corresponding to a wide extremity for the real image type and virtual image type objective optical systems. FIGS. 7C and 8C show positions of lenses corresponding to a tele extremity. FIGS. 7B and 8B show loci along which the lenses move. The lenses can be moved with use of a well-known lens driving mechanism so that the focal lengths thereof changes synchronously with change of the focal length of the photographing (zoom) lens. It may be possible to constitute the first and second objective optical system also as zoom lens systems. The above-described modification can be applied to each of the embodiments and modifications.

The present disclosure relates to subject matters contained in Japanese Patent Applications No. HEI 09-152974, No. HEI 09-152975, No. HEI 09-152976, No. HEI 09-152977, No. HEI 09-152978, No. HEI 09-152979, filed on May 27, 1997, which are expressly incorporated herein by reference in their entireties.

What is claimed is:

1. A finder system provided in a camera separately from a photographing optical system, comprising:

a first objective optical system for forming a first image of an object, said first image being a real image;

a second objective optical system for forming a second image of said object, said second image being a real image, said first and second objective optical systems being spaced from each other by a predetermined base length;

a light combining element that combines light passing through said first objective optical system and a part of light passing through said second objective optical system to superimpose a part of said second image with said first image within a field of view;

an erecting optical system for erecting said first image and said part of said second image combined by said light combining element;

an eyepiece optical system that directs light passing through said light combining element toward an eye of an observer;

a light deflecting device that deflects a path of light emerging from said second objective optical system to change degree of coincidence of said part of said second image with respect to said first image along a direction of said base length;

a passive distance measuring device for detecting a distance to said object, the passive distance measuring device including a pair of imaging lenses having optical axes that extend in parallel, optical paths of said pair of imaging lenses being different than optical paths of the first and second objective optical systems; and a controller which controls said light deflecting device such that said part of said second image and said first image of an object which is located at said distance detected by said active distance measuring device coincide with each other.

2. The finder system according to claim 1, wherein said light combining element is arranged between said first objective optical system and said erecting optical system.

3. The finder system according to claim 1, wherein an image plane of said first objective optical system and an image plane of said second objective optical system are substantially on a same plane.

4. The finder system according to claim 1, further comprising a magnification changing system that changes a magnification of said first objective optical system in accordance with change of focal length of said photographing optical system, and further changing magnification of said second objective optical system such that magnification of said second objective optical system equals to magnification of said first objective optical system.

5. The finder system according to claim 1, wherein said light deflecting device includes a rotatable mirror and a mirror driving system that drives said rotatable mirror to rotate.

6. The finder system according to claim 1, wherein said light deflecting device includes a plurality of lenses, at least one lens of said plurality of lenses being arranged such that an optical axis of said at least one lens being displaced in a direction orthogonal to an optical axis of said second objective optical system.

7. A finder system provided in a camera separately from a photographing optical system, comprising:

a first objective optical system for forming a first image of an object, said first image being a real image;

a second objective optical system for forming a second image of said object, said second image being a real image, said first and second objective optical systems being spaced from each other by a predetermined base length;

a light combining element that combines light passing through said first objective optical system and a part of light passing through said second objective optical system to superimpose a part of said second image with said first image within a field of view;

an erecting optical system for erecting said first image and said part of said second image combined by said light combining element;

an eyepiece optical system that directs light passing through said light combining element toward an eye of an observer;

a light deflecting device that deflects a path of light emerged from said second objective optical system to change degree of coincidence of said part of said second image with respect to said first image along a direction of said base length;

an active distance measuring device for detecting a distance to said object, the active distance measuring device including a light emitting device and a light receiving device, the light emitting device emitting light toward said object via at least one of lenses included in said first objective optical system; and a controller which controls said light deflecting device such that said part of said second image and said first image of an object which is located at said distance detected by said active distance measuring device coincide with each other.

8. The finder system according to claim 7, wherein said light combining element is arranged between said first objective optical system and said erecting optical system.

9. The finder system according to claim 7, wherein an image plane of said first objective optical system and an image plane of said second objective optical system are substantially on a same plane.

10. The finder system according to claim 7, further comprising a magnification changing system that changes a magnification of said first objective optical system in accordance with change of focal length of said photographing optical system, and further changing magnification of said second objective optical system such that magnification of said second objective optical system equals to magnification of said first objective optical system.

11. The finder system according to claim 7, wherein said light deflecting device includes a rotatable mirror and a mirror driving system that drives said rotatable mirror to rotate.

12. The finder system according to claim 7, wherein said light deflecting device includes a plurality of lenses, at least one lens of said plurality of lenses being arranged such that an optical axis of said at least one lens being displaced in a direction orthogonal to an optical axis of said second objective optical system.

13. The finder system according to claim 7, wherein said distance measuring device further comprises a first half mirror which is provided between said first objective optical system and said erecting optical system, wherein said light emitting device emits light toward said object by way of said first half mirror.

14. The finder system according to claim 13, wherein said first half mirror functions as said light combining element.

15. The finder system according to claim 7, wherein said active distance measuring device comprises a light emitting system and a light receiving system, said light receiving system including a second half mirror provided on an object side of said second objective optical system, said light receiving system receives light passed through said second half mirror.

16. The finder system according to claim 15, wherein said second half mirror functions as said light deflecting device.

17. A finder system provided in a camera separately from a photographing optical system, comprising:

a first objective optical system for forming a first image of an object, said first image being a real image;

a second objective optical system for forming a second image of said object, said second image being a virtual image, said first and second objective optical systems being spaced from each other by a predetermined base length;

an erecting optical system for erecting said first image formed by said first objective optical system;

a light combining element that combines light passing through said first objective optical system to superimpose a part of said second image with said first image within a field of view;

an eyepiece optical system that directs light passing through said light combining element toward an eye of an observer;

a light deflecting device that deflects a path of light emerging from said second objective optical system to change degree of coincidence of said part of said second image with respect to said first image along a direction of said base length;

a passive distance measuring device for detecting a distance to said object, the passive distance measuring device including a pair of imaging lenses having optical axes that extend in parallel, optical paths of said pair of imaging lenses being different than optical paths of the first and second objective optical systems; and a controller which controls said light deflecting device such that said part of said second image and said first image of an object which is located at said distance detected by said active distance measuring device coincide with each other.

18. The finder system according to claim 17, wherein said light combining element is arranged between an image plane of said first objective optical system and said eyepiece optical system.

19. The finder system according to claim 17, wherein said light combining element comprises a half mirror surface formed on said erecting optical system.

20. The finder system according to claim 17, wherein positions of image planes of said first objective optical system and said second objective optical system viewed from said eyepiece optical system are substantially the same.

21. The finder system according to claim 17, further comprising a magnification changing system that changes a magnification of said first objective optical system in accordance with change of focal length of said photographing optical system, and further changing magnification of said second objective optical system such that magnification of said second objective optical system equals to magnification of said first objective optical system.

22. The finder system according to claim 17, wherein said light deflecting device includes a rotatable mirror and a mirror driving system that drives said rotatable mirror to rotate.

23. The finder system according to claim 17, wherein said light deflecting device includes a plurality of lenses, at least one lens of said plurality of lenses being arranged such that an optical axis of said at least one lens being displaced in a direction orthogonal to an optical axis of said second objective optical system.

24. A finder system provided in a camera separately from a photographing optical system, comprising:

a first objective optical system for forming a first image of an object, said first image being a real image;

a second objective optical system for forming a second image of said object, said second image being a virtual image, said first and second objective optical systems being spaced from each other by a predetermined base length;

an erecting optical system for erecting said first image formed by said first objective optical system;

a light combining element that combines light passing through said first objective optical system to superimpose a part of said second image with said first image within a field of view;

an eyepiece optical system that directs light passing through said light combining element toward an eye of an observer;

a light deflecting device that deflects a path of light emerging from said second objective optical system to change a degree of coincidence of said part of said second image with respect to said first image along a direction of said base length;

an active distance measuring device for detecting a distance to said object, the active distance measuring device including a light emitting device and a light receiving device, the light emitting device emitting light toward said object via at least one of lenses included in said first objective optical system; and a controller which controls said light deflecting device such that said part of said second image and said first image of an object which is located at said distance detected by said active distance measuring device coincide with each other.

25. The finder system according to claim 24, wherein said light combining element is arranged between said first image and said eyepiece optical system.

26. The finder system according to claim 25, wherein said light combining element comprises a half mirror surface, said half mirror surface being one of a reflection planes of said erecting optical system.

27. The finder system according to claim 24, wherein positions of image planes of said first objective optical system and said second objective optical system viewed from said eyepiece optical system are substantially the same.

28. The finder system according to claim 24, further comprising a magnification changing system that changes a magnification of said first objective optical system in accordance with change of focal length of said photographing optical system, and further changing magnification of said second objective optical system such that magnification of said second objective optical system equals to magnification of said first objective optical system.

29. The finder system according to claim 24, wherein said light deflecting device includes a rotatable mirror and a mirror driving system that drives said rotatable mirror to rotate.

30. The finder system according to claim 24, wherein said light deflecting device includes a plurality of lenses, at least one lens of said plurality of lenses being arranged such that an optical axis of said at least one lens being displaced in a direction orthogonal to an optical axis of said second objective optical system.

31. The finder system according to claim 24, wherein distance measuring device further comprises a first half mirror which is provided between said first objective optical system and said erecting optical system, wherein said light emitting device emits light toward said object by way of said first half mirror.

32. The finder system according to claim 24, wherein said active first half mirror is provided between said first objective optical system and an image plane of said first objective optical system.

33. The finder system according to claim 32, wherein said first half mirror is formed on one of reflection surfaces of said erecting optical system.

34. The finder system according to claim 24, wherein said active distance measuring device comprises a light emitting system and a light receiving system, said light receiving system including a second half mirror provided on an object side of said second objective optical system, said light receiving system receives light passed through said second half mirror.

35. The finder system according to claim 34, wherein said second half mirror functions as said light deflecting device.

36. A finder system provided for a camera, said finder system being provided separately from a photographing optical system of said camera, comprising:

a first objective optical system for forming a virtual image of an object;

a second objective optical system for forming a real image of said object, said first and second objective optical systems being spaced from each other by a predetermined base length;

an erecting optical system for erecting said real image formed by said second objective optical system;

a light combining element that combines light passing through said first objective optical system and a part of light passed through said second objective optical system to form superimposed images on a predetermined area within a field of view;

an eyepiece optical system that directs light passing through said light combining element toward an eye of an observer;

a light deflecting device that deflects a path of light from an object which is directed to said light deflecting device with respect to a path of light emerged from said second objective optical system to change degree of coincidence of said superimposed images along a direction of said base length;

a passive distance measuring device for obtaining information related to a distance to said object, the passive distance measuring device including a pair of imaging lenses having optical axes that extend in parallel, optical paths of said pair of imaging lenses being different than optical paths of the first and second objective optical systems; and a controller which controls said light deflecting device such that said superimposed images of an object whose distance is equal to said distance detected by said passive distance measuring device coincide with each other.

37. The finder system according to claim 36, wherein said light combining element is arranged between said first objective optical system and said eyepiece optical system.

38. The finder system according to claim 36, further comprising a frame displaying device which displays a lighting type bright frame within said field of view.

39. The finder system according to claim 38, wherein said frame displaying device includes a lighting window, a frame mask, and a half mirror, light entered from said lighting window being passed through said frame mask, reflected by said half mirror and combined with light passed through one of said first objective optical system and said second objective optical system.

40. The finder system according to claim 39, wherein said half mirror is provided between said second objective optical system and said light combining element.

41. The finder system according to claim 39, wherein said frame mask is located at a position which is optically equivalent to an image plane of said second objective optical system.

42. The finder system according to claim 36, further comprising a magnification changing system that changes a magnification of said first objective optical system in accordance with change of focal length of said photographing optical system, and further changing magnification of said second objective optical system such that magnification of said second objective optical system equals to magnification of said first objective optical system.

43. The finder system according to claim 36, wherein said light deflecting device includes a rotatable mirror and a mirror driving system that drives said rotatable mirror to rotate.

44. The finder system according to claim 36, wherein said light deflecting device shifts at least one lens included in said second objective optical system in a direction orthogonal to an optical axis of said second objective optical system.

45. A finder system provided in a camera separately from a photographing optical system, comprising:
- a first objective optical system for forming a virtual image of an object;
- a second objective optical system for forming a real image of said object, said first and second objective optical systems being spaced from each other by a predetermined base length;
- an erecting optical system for erecting said real image formed by said second objective optical system;
- a light combining element that combines light passing through said first objective optical system and a part of light passing through said second objective optical system to form superimposed images on a predetermined area within a field of view;
- an eyepiece optical system that directs light passed through said light combining element toward an eye of an observer;
- a light deflecting device that deflects a path of light emerging from said second objective optical system to change a degree of coincidence of said superimposed images along a direction of said base length;
- an active distance measurement device for obtaining information related to a distance to said object, the active distance measurement device including a light emitting device and a light receiving device, the light emitting device emitting light toward said object via at least part of the first objective optical system; and
- a controller which controls said light deflecting device such that said part of said superimposed images of an object whose distance is equal to said distance detected by said active distance measuring device coincide with each other.

46. The finder system according to claim 45, wherein said light combining element is arranged between said first objective optical system and said eyepiece optical system.

47. The finder system according to claim 45, further comprising a frame displaying device which displays a lighting type bright frame within said field of view.

48. The finder system according to claim 47, wherein said frame displaying device includes a lighting window, a frame mask, and a half mirror, light entered from said lighting window being passed through said frame mask, reflected by said half mirror and combined with light passed through one of said first objective optical system and said second objective optical system.

49. The finder system according to claim 48, wherein said light emitting system emits light toward the object through said lighting window.

50. The finder system according to claim 48, wherein said frame mask is located at a position which is optically equivalent to an image plane of said second objective optical system.

51. The finder system according to claim 45, further comprising a magnification changing system that changes a magnification of said first objective optical system in accordance with change of focal length of said photographing optical system, and further changing magnification of said second objective optical system such that magnification of said second objective optical system equals to magnification of said first objective optical system.

52. The finder system according to claim 45, wherein said light deflecting device includes a rotatable mirror and a mirror driving system that drives said rotatable mirror to rotate.

53. The finder system according to claim 45, wherein said light deflecting device shifts at least one lens included in said second objective optical system in a direction orthogonal to an optical axis of said second objective optical system.

54. The finder system according to claim 45, wherein said light emitting device emits light toward said object by way of a half mirror which is provided between said first objective optical system and said eyepiece optical system.

55. The finder system according to claim 54, wherein said half mirror functions as said light combining element.

56. The finder system according to claim 49, wherein said active distance measuring device comprises a light emitting system and a light receiving system, said light emitting system emitting light toward said object through said light take window.

57. The finder system according to claim 46, wherein said active distance measuring device comprises a light projecting system and a light receiving system, said light receiving system receiving light emitted by said light projecting system and reflected by said object by way of a half mirror which is provided on an object side with respect to said second objective optical system.

58. The finder system according to claim 57, wherein said half mirror functions as said light deflecting device.

* * * * *

UNITED STATES PATENT AND TRADEMARK OFFICE
CERTIFICATE OF CORRECTION

PATENT NO.    : 6,041,186
DATED         : March 21, 2000
INVENTOR(S)   : T. Sensui It is certified that error appears in the above-identified patent and that said Letters Patent is hereby corrected as shown below:

<u>Title page,</u>
Item [73], Assignee, "Kaish" should be -- Kaisha --.

Signed and Sealed this

Eleventh Day of March, 2003

JAMES E. ROGAN
*Director of the United States Patent and Trademark Office*